(12) United States Patent
Zimmer

(10) Patent No.: US 6,306,220 B1
(45) Date of Patent: Oct. 23, 2001

(54) WINDSHIELD WIPING DEVICE FOR VEHICLES

(75) Inventor: Joachim Zimmer, Sasbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/445,136

(22) PCT Filed: Jul. 9, 1998

(86) PCT No.: PCT/DE98/01915

§ 371 Date: Dec. 2, 1999

§ 102(e) Date: Dec. 2, 1999

(87) PCT Pub. No.: WO99/06250

PCT Pub. Date: Feb. 11, 1999

(30) Foreign Application Priority Data

Aug. 1, 1997 (DE) .............................. 197 33 426

(51) Int. Cl.$^7$ .......................................... B60S 1/08
(52) U.S. Cl. .................. 134/6; 15/250.17; 318/DIG. 2; 318/285
(58) Field of Search ............................ 15/250.17, 250.16, 15/250.12, 250.13, 250.202; 134/6; 318/DIG. 2, 443, 444, 280, 281, 282, 285, 283

(56) References Cited

U.S. PATENT DOCUMENTS

| 4,559,484 | 12/1985 | Hirano . |
| 4,904,908 | 2/1990 | Buschur . |

FOREIGN PATENT DOCUMENTS

| 16 80 194 | 4/1975 | (DE) . |
| 2 714 641 A | 7/1995 | (FR) . |

Primary Examiner—Gary K. Graham
(74) Attorney, Agent, or Firm—Michael J. Striker

(57) ABSTRACT

A wiper device for vehicle windows is proposed, which prevents a longer lasting or permanent deformation of an elastically deformable wiper lip (28) that is formed onto the wiper blade (16) since this wiper lip (28) is stored in different parking positions (P1, P2) in a parking location (P) of the wiper blade (16).

10 Claims, 3 Drawing Sheets

WINDSHIELD WIPING DEVICE FOR VEHICLES

BACKGROUND OF THE INVENTION

The invention is based on a wiper device for vehicle windows.

There are known wiper systems for vehicle windows on the market which have a drive motor for driving a wiper, which has a wiper blade with an elastically deformable wiper lip and a carrying arm for the wiper blade. The carrying arm is pivoted against the window by a spring and the wiper lip is thereby pressed against the window and deformed. If the wiper is disposed in the parking position, then the wiper lip is put under a lot of stress by the intensive effect of sunlight, heat, and cold so that a longer lasting or permanent deformation of the wiper lip occurs, which results in an insufficient cleaning of the window. Furthermore, noise problems arise due to the slip-stick effect when wiping since the deformed wiper blade no longer flexibly adapts to the wiping direction.

DE-AS 16 80 194 has disclosed a wiper system which, in order to prevent the deformation of the wiper lip, has an adjusting device that engages the carrying arm and in the parking position of the wiper, this adjusting device pivots the carrying arm in opposition to the force of the spring and thereby reduces or neutralizes the pressing force of the wiper lip against the window. The adjusting device has a ramp that protrudes into the movement path of the carrying arm and is supported in stationary fashion perpendicular to the window and the carrying arm travels onto this ramp when it reaches the parking position.

A disadvantage in this connection is that additional means are used, for example the ramp, which can lead to an increased cost of the wiper system.

It is also disadvantageous that the lifting of the carrying arm of the wiper results in an increased space requirement, in particular the structural height, of the wiper system so that the outer or inner design of the vehicle must be changed in order to accommodate the wiper system. This is undesirable to the vehicle manufacturer for optical and economical reasons.

SUMMARY OF THE INVENTION

In accordance with the present invention the control unit has a timer so that the parking position of the wiper lip in the parking location can be alternatingly triggered at time intervals e.g. daily, weekly or monthly, particularly when the wiper device has not been operated for a predetermined time span of a month, for example.

The wiper device according to the invention has the advantage of preventing a longer lasting or permanent deformation of the elastically deformable wiper lip formed onto the wiper blade in a parking location of the wiper by virtue of the fact that this wiper lip is stored in different parking positions in the parking location.

It is particularly advantageous that the parking positions of the wiper lip correspond to the drag positions of the wiper lip when wiping back and forth. The parking positions of the wiper lip are therefore simply produced by means of a control unit through the varying approaches to the parking position. In the parking location, the wiper lip is therefore disposed in parking positions that ensue directly from the drag position of the wiper lip when wiping and therefore can be obtained without additional means.

It is furthermore advantageous that the control unit detects and stores the most recently produced parking position of the wiper lip in the parking location and, depending on this and on presets stored in the control unit, the wiper lip is stored in the other parking position so that the parking positions alternate. This occurs particularly with the next arrival at the parking location or with the arrival at the parking location after a predetermined interval of time since the most recent alternation.

It is also advantageous that a rotary motor or a reversing motor can be used as the drive motor.

Another advantage is that when the wiper device is not operated over a longer predetermined span of time, e.g. a month, and when a reversing motor is used, the control unit changes the parking position of the wiper lip without the wiper operation having to be switched on for this purpose. The wiper lip is thus likewise protected from a permanent deformation during the low-rain summer months. With the use of a rotary motor, this is only possible with the transition from a first parking position into a second parking position. The transition in the reverse direction from the second parking position into the first parking position is thereby carried out by triggering a wiping cycle.

BRIEF DESCRIPTION OF THE DRAWINGS

Preferred embodiments of the invention are shown in the drawings and will be explained in detail in the subsequent description.

DESCRIPTION OF THE EXEMPLARY EMBODIMENT

Figure 1:
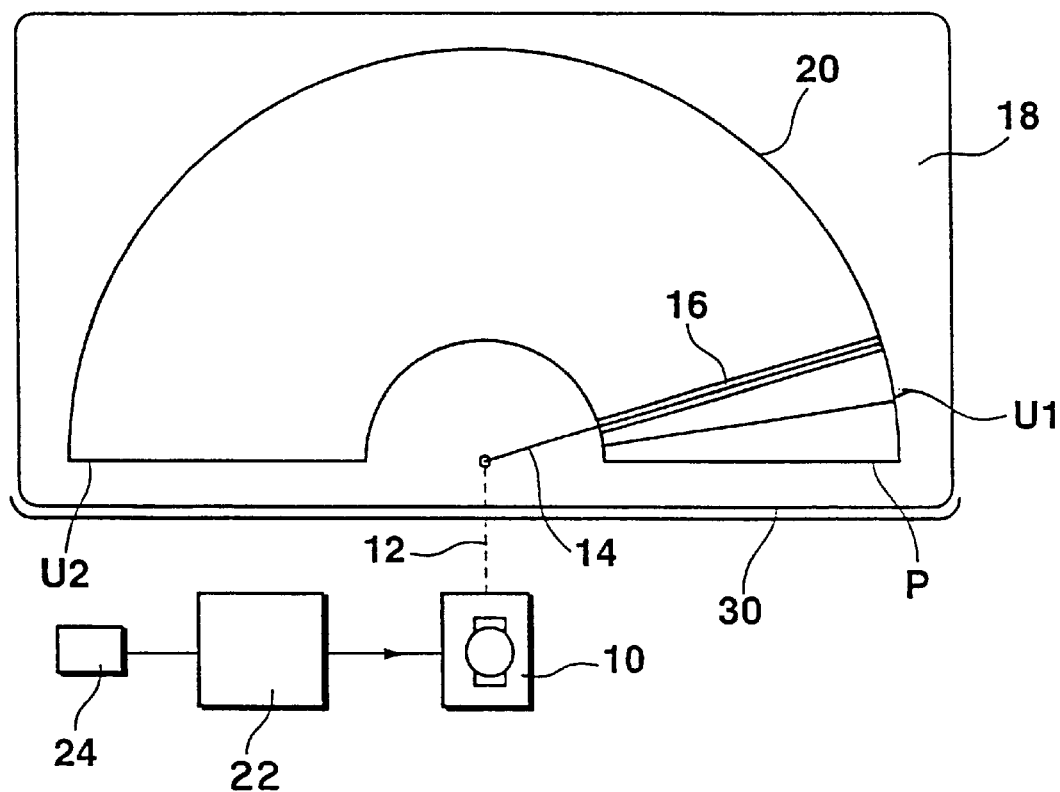
FIG. 1 is a schematic depiction of the wiper device according to the invention.

The wiping device according to the invention has a motor 10, which drives a wiper 14 by way of a connection 12 that is depicted with dashed lines. The wiper 14 has a wiper blade 16, with which a window 18 is wiped in the vicinity of a wiping field 20 between two reversal positions U1, U2. To that end, a control unit 22 triggers the motor 10 in different wiping operations, which can in turn be manually preset by means of an operating switch 24. It is likewise conceivable to control the wiping operation based on signals of a rain sensor.

The wiper 14 is moved into a parking location P when the wiping operation of the wiper 14 is switched off or interrupted in an interval operation. In the latter instance, the wiper 14 is parked in the parking location P between the individual wiping cycles of the interval operation. The parking location P is usually disposed at the lower edge of the window 18 close to the window edge 30.

A reversing motor is used as the motor 10, which drives the wiper 14 to oscillate back and forth, for example by means of a rotatable motor crank, not shown, and an oscillation mechanism as a connection 12. By varying the rotation angle of the motor crank, different parking positions are produced in the parking location P. Another alternative for embodying the connection 12 is comprised in attaching the wiper 14 directly to the drive shaft of the motor 10 so that the parking positions in the parking location P can be arrived at by varying the rotation angle of the motor drive shaft.

Figure 2A:
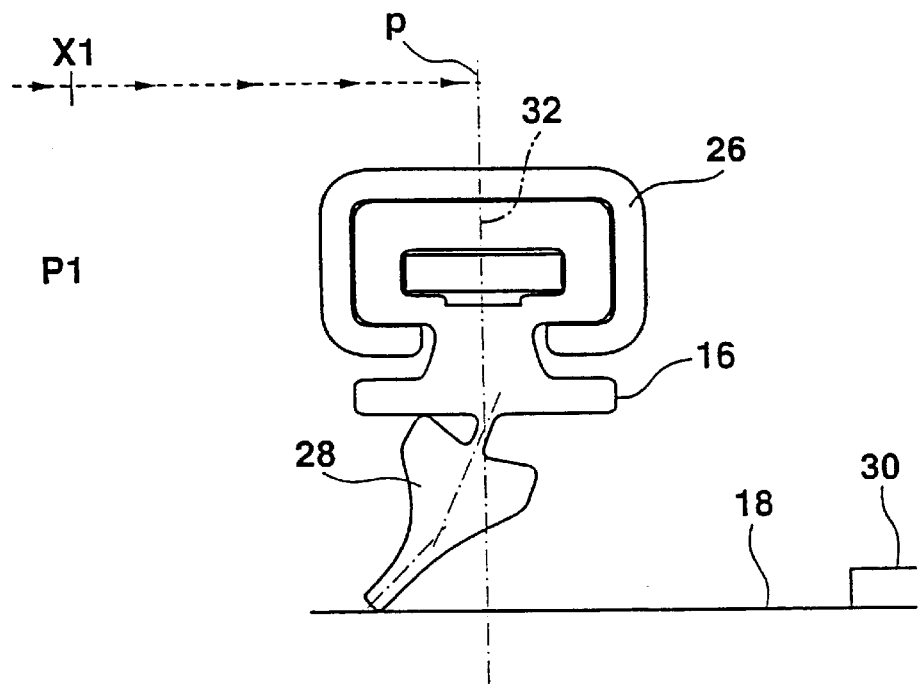
FIGS. 2a and 2b show cross sections through a wiper blade with a wiper lip formed onto it in a first and second parking position, respectively.
Figure 2B:
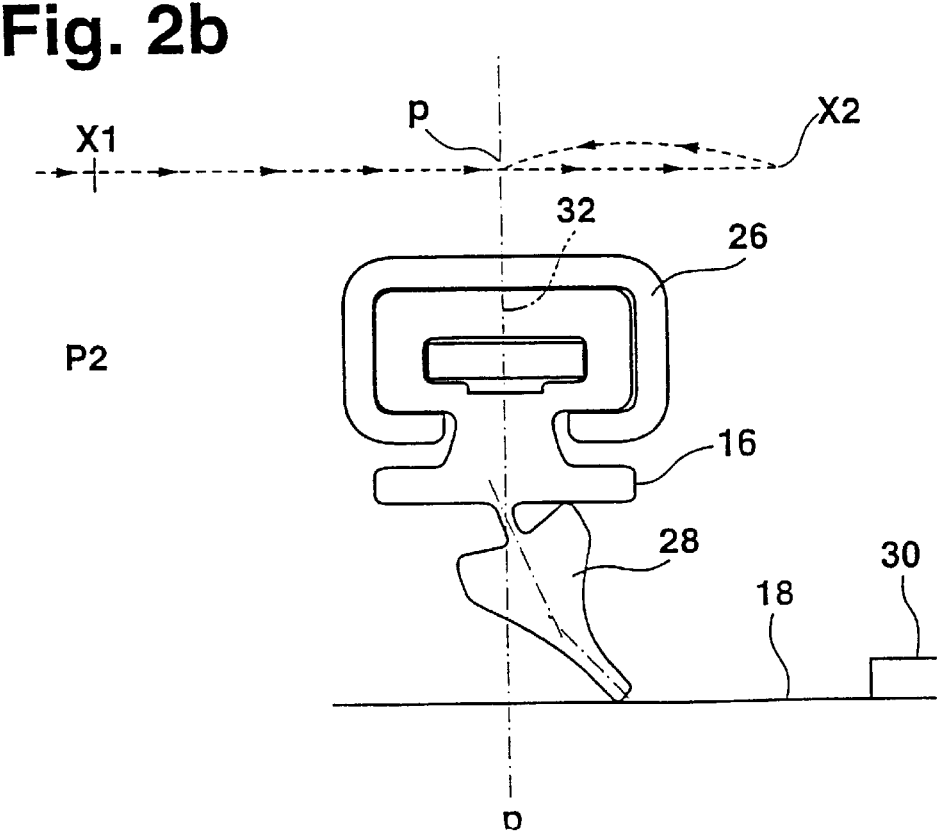

FIG. 2a shows a first parking position P1 of the wiper blade 16 in the parking location P and FIG. 2b shows a second parking position P2. The wiper blade 16 is fastened in a securing device 26 on the wiper 14. A wiper lip 28 is formed onto the wiper blade 16. In the first parking position P1, the wiper lip 28 is directed away from the window edge 30; in the second parking position P2, it is directed toward this edge.

A symmetry axis 32 of the wiper blade 16 in the unstressed state is likewise depicted. In the following, the position of the wiper blade 16 will be defined by means of the symmetry axis 32. For example, the wiper 14 is disposed in the parking location P when the symmetry axis 32 and the parking location P are congruent.

Dashed arrows are used to show the movement direction of the wiper blade 16 until it is stored in the parking location P in the first or second parking position P1, P2. The positions X1 or X1 and X2 are likewise shown, which indicate specific positions of the wiper blade 16 when arriving at the first or second parking position P1, P2.

Figure 3:
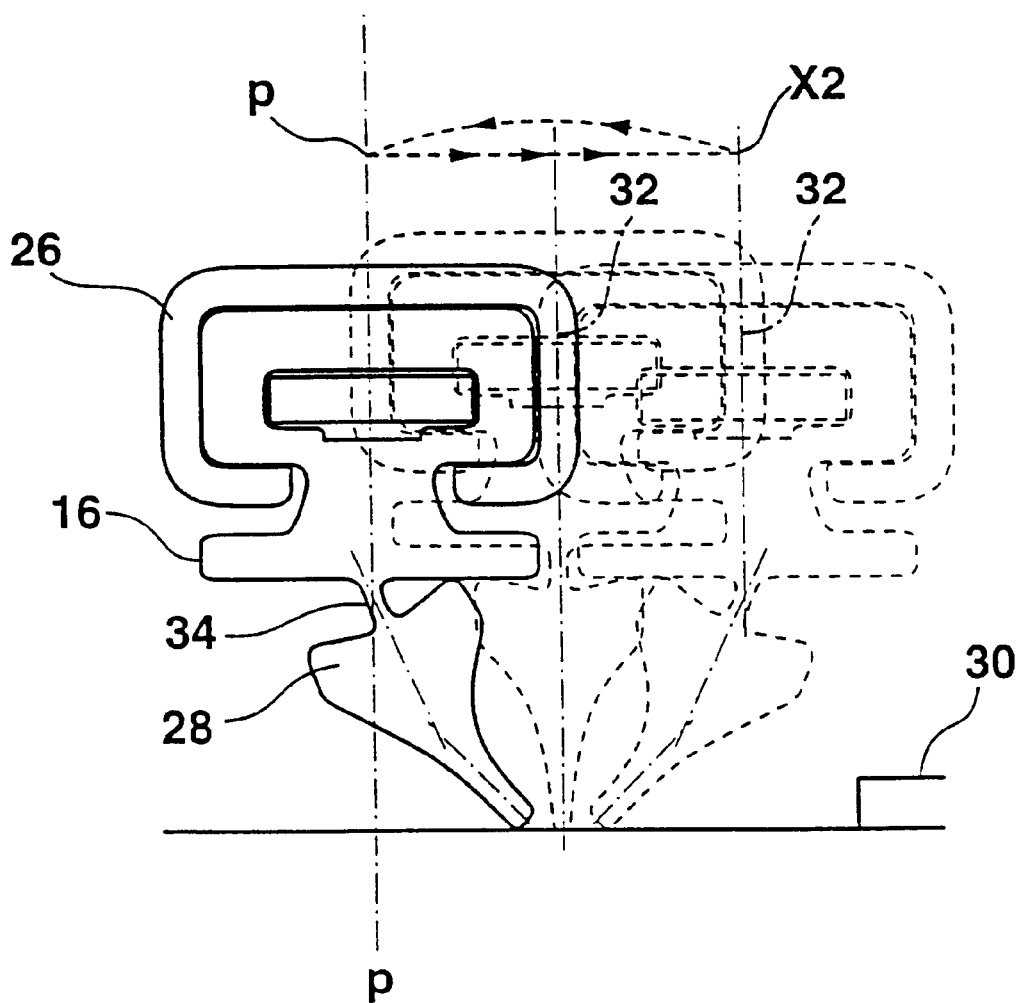
FIG. 3 shows the reversal process of the wiper lip by way of a reversing stem in a change of the wiping direction in order to arrive at the second parking position.

The reversal process of the wiper blade 16 for arriving at the second parking position P2 is shown in FIG. 3. The wiper lip 28 is connected to the wiper blade 16 by way of a reversal piece 34.

The function of the device according to the invention according to FIG. 1 will be described below in conjunction with FIGS. 2 and 3.

The wiper device for vehicle windows 18 according to the invention, particularly in motor vehicles, wipes the window 18, for example in a continuous wiping operation. After the operating switch 24 is actuated to switch off the wiping operation, the control unit 22 moves the wiper blade 16 into the parking location P.

The arrival at the first parking position P1 will now be described in conjunction with FIG. 2a. The position X1 indicates an arbitrary position of the wiper blade 16 within the wiping field 20 before the parking location P. During the wiping, the wiper lip 28 is bent away from the wiping direction. For example, if the wiper blade 16 is moving toward the right, then the wiper lip 28 is bent toward the left. This position of the wiper lip 28 will be referred to below as the first drag position since it is thus respectively dragged along by the wiper blade 16.

If the wiper blade 16 reaches the parking location P, then the motor 10 is switched off and the wiper lip 28 is disposed in the first parking position P1, which corresponds to the first drag position of the wiper lip 28.

The arrival at the second parking position P2 will be explained in conjunction with FIG. 2b. Starting from the position X1, the wiper blade 16 is moved past the parking location P to the position X2. Here, the control unit 22 reverses the motor 10 so that the wiping direction changes and the wiper blade 16 moves toward the parking location P again. The wiper lip 28 is thereby reversed in accordance with FIG. 3 from the first drag position into the second drag position by way of the reversing stem 34. When the parking location P is reached, the control unit 22 switches off the motor 10 and the wiper lip 28 is disposed in the second parking position P2.

It is clear in FIG. 3 that in order to arrive at the second parking position P2, the parking location P must be traveled past until the wiper lip 28 can easily tilt into the second drag position by way of the reversal piece 34. The distance between the position X2 and the parking location P therefore ensues from the geometry of the wiper lip 28 and its tilting angle in relation to the symmetry axis 32 in the drag position and is predetermined.

The alternating storage of the wiper lip 28 in the two parking positions P1, P2 is carried out by means of the control unit 22. This unit has a non-volatile memory in which presets are stored and in which the parking position P1, P2 most recently assumed is stored. In accordance with the presets, with repeated switching off of the wiper operation or parking of the wipers 14 in the interval pauses of the interval operation, the wiper lip 28 is stored in this parking position P2 or the other parking position P1. Preferably, the parking positions P1, P2 alternate after each time the wiper operation is switched off by means of the operating switch 24.

Alternatively, the control unit 22 also has a timer so that the parking position P1, P2 changes in a weekly, monthly, or arbitrary other rhythm.

In order to also prevent an undesirable deformation of the wiper lip 28 when the wiper device is not being operated, the control unit 22 changes the parking position P1, P2 of the wiper lip 28 after a predetermined time span without the wiper operation being switched on for this purpose. This predetermined time span is one month, for example.

This takes place in such a way that in order to reverse the wiper lip 28 from the first parking position P1 into the second parking position P2, the control unit 22 moves the wiper blade 16 a first preset distance to the position X2 in the direction of the window edge 30 and then back again to the parking location P. For the opposite instance, the reversal of the wiper lip 28 from the second parking position P2 into the first parking position P1, the control unit 22 moves the wiper blade 16 a second preset distance in the direction of the wiping field 20 and back to the parking location P again. The second preset distance comparatively corresponds at least to the first preset distance and can likewise extend to the first reversal position U1. When a rotary motor that cannot be reversed is used, in this instance, the control unit triggers a wiping cycle so that the wiper blade 16 is moved to the second reversal position U2.

It is likewise possible to combine the first and second parking position P1, P2 with an intrinsically known extended or recessed parking location in which the wiper 14 is stored among other things in order to reduce the air resistance of the vehicle.

In an alternative exemplary embodiment, a rotary motor is used as the motor 10. The extended position of the linkage is then associated with the position X2. The two parking positions P1, P2 in the parking location P are thereby realized in such a way that the wiper 14 is parked shortly before or after the extended position of the linkage. In this connection, an arbitrary linkage can be used as the linkage.

What is claimed is:

1. A wiper device for vehicle windows, comprising a motor; at least one wiper which is moved back and forth over a window and having a wiper blade movable into a parking location and an elastically deformable wiper lip formed on said wiper blade; a control unit controlling said motor, said wiper lip being storable in different parking positions in said parking location; and a timer arranged so that the parking positions of said wiper lip in said parking location are alternatingly triggerable at time intervals when the wiper device has not been operated for a predetermined time span.

2. A wiper device as defined in claim 1, wherein said control unit is operable for storing said wiper lip alternatingly in a first or a second parking position in said parking location, which positions correspond to a first or a second drag position of said wiper lip, and with a direction change of said wiper, said wiper lip tilting from one drag position into the other drag position.

3. A wiper device as defined in claim 1, wherein said control unit has a memory which stores said parking positions of said wiper lip of a most recent arrival into said parking location, and depending on presets stored in said control unit, said wiper lip is stored in said first parking position or in said second parking position when it next arrives at said parking location.

4. A wiper device as defined in claim 3, wherein said parking positions of said wiper lip in said parking location alternate with each arrival at said parking location, after each time an operation of said wiper is switched off.

5. A wiper device as defined in claim 1, wherein said motor is a rotary motor.

6. A wiper device as defined in claim 1, wherein said motor is a reversing motor.

7. A process for wiping vehicle windows with a wiper device having a motor, comprising the steps of moving at least one wiper back and fourth over a window, with a wiper blade movable into a parking location and a elastically deformable wiper lip formed on the wiper blade; controlling the motor by a control unit so as to store said wiper lip alternatingly in a first or a second parking position in the parking location, which positions correspond to a first and a second drag position; changing by the control unit the parking position of the wiper lip at time intervals when the wiper device has not been operated for a predetermined time span.

8. A process as defined in claim 7; and further comprising storing the wiper lip in the first parking position by means of arrival at the parking location; and switching off of the motor when the wiper blade reaches the parking location.

9. A process as defined in claim 7; and further comprising the steps of storing the wiper lip in the second parking position by means of arrival at the parking location; wiping past the parking location; reversing the wiping device toward the parking location after a predetermined interval; and switching off of the motor when the wiper blade reaches the parking location.

10. A process as defined in claim 7; and further comprising, in order to reverse the wiper lip from the first parking position into the second parking position, moving the wiper blade by the control unit a predetermined distance in direction of a window edge to a predetermined position and back toward the parking location; and in order to reverse the wiper lip from the second parking position into the first parking position, moving the wiper blade by the control unit a predetermined distance in direction of a wiping field to the first or second reversal position and back toward the parking location.

\* \* \* \* \*